(12) United States Patent
Brillon

(10) Patent No.: US 6,828,900 B2
(45) Date of Patent: Dec. 7, 2004

(54) PROCESS FOR CONTROLLING ANTENNAS

(75) Inventor: Alain Brillon, Villeuneuve Tolosane (FR)

(73) Assignee: Siemens VDO Automotive, Toulouse Cedex (FR)

( * ) Notice: Subject to any disclaimer, the term of this patent is extended or adjusted under 35 U.S.C. 154(b) by 308 days.

(21) Appl. No.: 10/124,473

(22) Filed: Apr. 18, 2002

(65) Prior Publication Data

US 2002/0154002 A1 Oct. 24, 2002

(30) Foreign Application Priority Data

Apr. 19, 2001 (FR) .............................................. 01 05298

(51) Int. Cl.$^7$ .............................................. G05B 19/00
(52) U.S. Cl. ...................... 340/5.61; 455/63.1; 455/129
(58) Field of Search ............................... 340/5.61, 5.72, 340/825.49; 343/815, 817, 818; 455/63.1, 129, 121, 575.7, 41.1–41.3

(56) References Cited

U.S. PATENT DOCUMENTS

| 4,426,624 A | * | 1/1984 | Beauducel et al. | ........... 330/86 |
| 4,688,036 A | * | 8/1987 | Hirano et al. | .............. 340/5.62 |
| 5,973,611 A | * | 10/1999 | Kulha et al. | ............... 340/5.62 |
| 6,100,603 A | * | 8/2000 | Gold | ......................... 307/10.2 |
| 6,507,573 B1 | * | 1/2003 | Brandt et al. | ............... 370/335 |

FOREIGN PATENT DOCUMENTS

| DE | 198 50 455 | 1/2000 |
| DE | 198 45 649 | 4/2000 |

* cited by examiner

Primary Examiner—Michael Horabik
Assistant Examiner—Matsuichiro Shimizu
(74) Attorney, Agent, or Firm—Young & Thompson

(57) ABSTRACT

This process is adapted for at least two groups of antennas (4, 6). A modulated signal is emitted by a first group of antennas (4) whilst the antennas (6) of a second group emit a similar modulated parasitic signal but of less amplitude.

An unmodulated signal of an amplitude comprised between the amplitude of the parasitic signal and the amplitude of the signal emitted by the first group of antennas (4) is superposed on the parasitic signal emitted by the antennas (6) of the second group.

Application to a free hand system for access and/or starting of an automotive vehicle.

5 Claims, 2 Drawing Sheets

PROCESS FOR CONTROLLING ANTENNAS

FIELD OF THE INVENTION

The present invention relates to a process for controlling antennas as well as a corresponding device adapted particularly for a free hand system of an automotive vehicle.

BACKGROUND OF THE INVENTION

A free hand system permits access to a vehicle and starting the latter without having to use a mechanical key. The user of the vehicle is thus simply provided with an electronic card (also called hereinafter a badge) which is detected and recognized by a control and management device associated with the antennas disposed onboard the vehicle. If the card is identified by the control and management device as being a card authorized for the vehicle, the bearer of this card can enter the vehicle by simply grasping a door handle and starting the motor of the vehicle by simple action on a button.

Generally, for such a free hand system, a group of antennas is adapted to detect the presence of the badge outside the vehicle and another within the latter. If an authorized badge is detected outside the vehicle, the control and management system will permit access to the interior of the vehicle without however permitting starting, whilst if this badge is within the vehicle, starting the motor can take place.

To locate the badge, a signal is sent to a group of antennas which thus carries out a corresponding emission whilst no signal is sent to the other antennas such that they remain inactive. The antennas used are LF antennas (Low Frequency) with a small field, thereby permitting carrying out good location of the corresponding badge.

The control and management device includes electronics comprising particularly amplifier circuits to send high power signals to the antennas. This control electronics of the antennas does not permit low cost sending of a high power signal to a group of antennas without sending a corresponding weak signal to the antennas adapted to remain inactive. This is due to a problem of diaphony, known to those skilled in the art, between the different amplifier circuits.

In a free hand system for an automotive vehicle, this problem of diaphony can lead to errors of location of the badge of the vehicle. Thus for example, when the internal antennas emit a high powered signal in the direction of the badge in order to detect it, the external antennas themselves also emit a signal, albeit of low power, but which can be detected by the badge. If the badge is thus located immediately adjacent an external antenna, it will be identified and located as being within the vehicle. In the case in which the driver is outside the vehicle, with the badge in his rear pocket or his trousers against the handle of the door which generally includes the antenna, the badge will be considered as being inside the vehicle and during an attempt to start up, for example by an infant playing within the vehicle, the motor will be activated.

The solution of the prior art to resolve these problems of diaphony is the total disconnection of the antenna that should remain inactive, from the rest of the circuit, by for example a relay. This solution is effective but of high cost.

SUMMARY OF THE INVENTION

The present invention thus has for its object to provide a low cost solution to the problem of diaphony described above.

To this end, it proposes a process for controlling at least two groups of antennas according to which a modulated signal is emitted by a first group of antennas whilst the antennas of a second group emit a parasitic modulated signal that is comparable but of lesser amplitude.

According to the invention, a signal of unmodulated amplitude comprised between the amplitude of the parasitic signal and the amplitude of the signal emitted by the first group of antennas, is superposed on the parasitic signal emitted by the antennas of the second group.

Thus, rather than seeking to improve the performance of the electronics to suppress the parasitic signal on the antennas which it is desired to render inactive, an unmodulated signal is emitted by these antennas. The signal thus emitted is the superposition of the parasitic signal and the unmodulated signal. The amplitude of the unmodulated signal is selected such that the interpretation of the overall signal emitted by the antennas that should initially remain inactive, will not be possible.

Preferably, the amplitude of the unmodulated signal permits just masking the parasitic signal. It is thus for example comprised between twice the amplitude of the parasitic signal and half the amplitude of the signal emitted by the first group of antennas. This amplitude should not be too great, because the field thus emitted by the external antennas (with the signal that cannot be interpreted by the badge) will substantially overflow the interior of the vehicle and thus mask the field emitted by the internal antennas (which is itself modulated to be comprehended by the badge).

In one embodiment, the signal emitted by each antennas can be the superposition of a modulated signal, parasitic or not, and an unmodulated carrier.

The present invention also relates to a control device for antennas distributed in at least two groups of antennas comprising a modulator, a multiplexer disposed downstream of the modulator as well as an amplifier circuit disposed between each group of antennas and the multiplexer. According to the invention, a branch circuit comprising a resistance connects a point upstream of the modulator to a point downstream of the multiplexer, upstream of an amplifier circuit corresponding to a group of antennas. In this way, an unmodulated signal is superposed on the signal of a group of antennas.

In a modified embodiment, there corresponds to each group of antennas a branch circuit comprising a resistance.

The present invention finally relates to a system of free hand access to a vehicle comprising external antennas and internal antennas, an electronic identification card, as well as control electronics, characterized in that it comprises an antenna control device such as described above.

BRIEF DESCRIPTION OF THE DRAWINGS

The description which follows sets forth the operation, the characteristics and the advantages of a preferred embodiment of a control device according to the invention, with the help of the accompanying schematic drawings, in which.

DETAILED DESCRIPTION OF THE INVENTION

Figure 1:
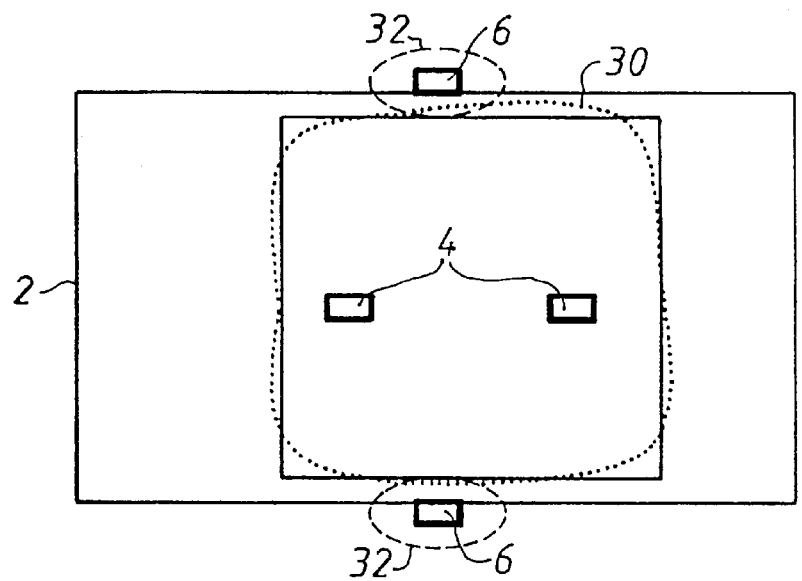
FIG. 1 is a schematic representation of a vehicle and its antennas for detecting a badge.

FIG. 1 shows very schematically an automotive vehicle 2, or vehicle 2, seen from above, provided with four LF (Low Frequency) antennas. Two of these antennas are disposed in the passenger compartment of the vehicle 2 and carry the reference numeral 4, whilst the two others are outside the vehicle and bear the reference numeral 6. The internal antennas 4 are for example disposed on the floor of the vehicle whilst the external antennas 6 are for example integrated into the external handles of the two front doors of the vehicle 2.

The antennas 4 and 6 are adapted to emit a modulated signal of predetermined power so as to permit having for the internal antennas 4 a sufficient range to cover all the interior of the passenger compartment of the vehicle 2 whilst the external antennas have a range of the order of 1 meter.

The signal emitted by the antennas is adapted to be received by an electric card also called in what follows a badge. When this card enters the field of emission of the antennas, it recognizes the modulated signal emitted by the antennas and thus emits in its turn a coded signal. This new signal is typically an RF (Radio Frequency) signal of a frequency of 433 MHz. It is received by an RF antenna provided for this purpose and analyzed to identify whether the code emitted by the badge corresponds to the code necessary to permit access to the vehicle 2 and starting of its motor.

The present invention and the description which follows concern essentially the signal emitted by the antennas 4 and 6 toward the badge.

Figure 4:
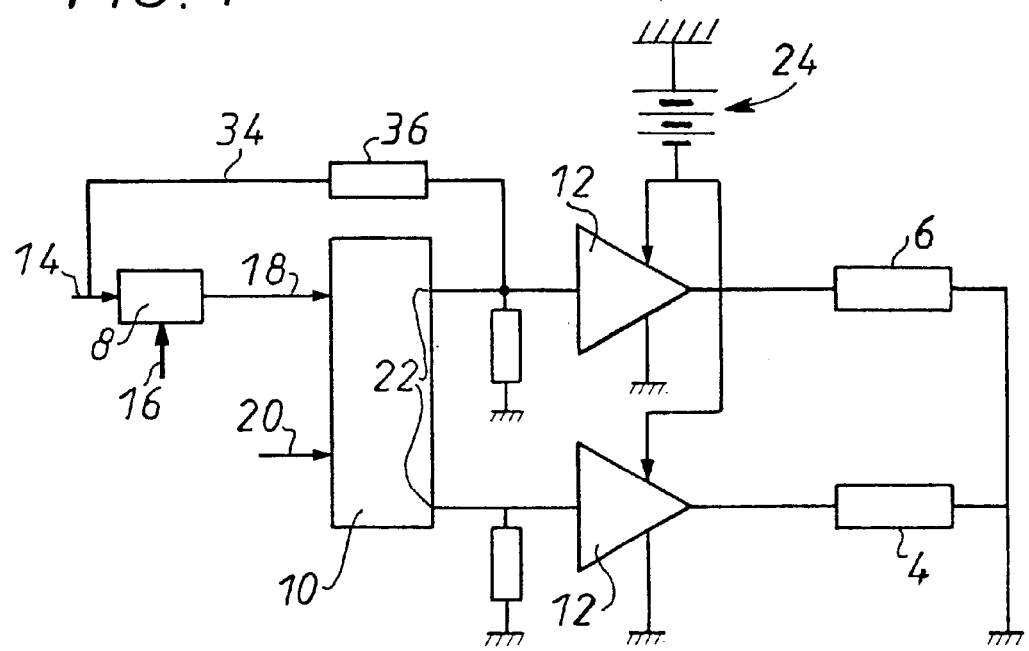
FIG. 4 shows schematically an electronic control circuit of the antennas of a vehicle.

The antennas 4 and 6 are used to dialog with the badge but also permit locating it. FIG. 4 shows schematically a control device for antennas permitting locating a badge to determine in a reliable manner whether this latter is located within the vehicle 2 or outside this vehicle, at a small distance from the antennas 6. This device comprises a modulator 8, an analog multiplexer 10 and two amplifiers 12.

The modulator 8 is supplied by a carrier 14 as well as by a signal 16 to be modulated, and supplies a modulated signal 18 which is injected into an input of the analog multiplexer 10. This latter also comprises a second input by which it receives a signal 20 indicating to which antennas the modulated signal 18 should be sent.

In the present case of the drawings, the antennas are grouped in two groups of antennas, the external antennas 6 and the internal antennas 4. The multiplexer 10 thus comprises two outputs 22, one toward each of the groups of antennas. The output signal of the multiplexer is amplified each time by an amplifying circuit which comprises an amplifier 12. The two amplifiers are supplied by a same voltage source 24. The signal amplified by each circuit is thus sent to the corresponding antennas to be emitted toward a badge.

A device as described above is already known to those skilled in the art and is already used for the control of antennas.

Let it be supposed in what follows, that the signal 20 for selecting antennas controls the sending of a signal only by the internal antennas 4. With the device described above and known in the prior art, the signal supplying the internal antennas 4 is for example of the shape shown in the first diagram of FIG. 2 by the curve 26. The amplitude of this signal is for example of the order of 20 V.

Figure 2:
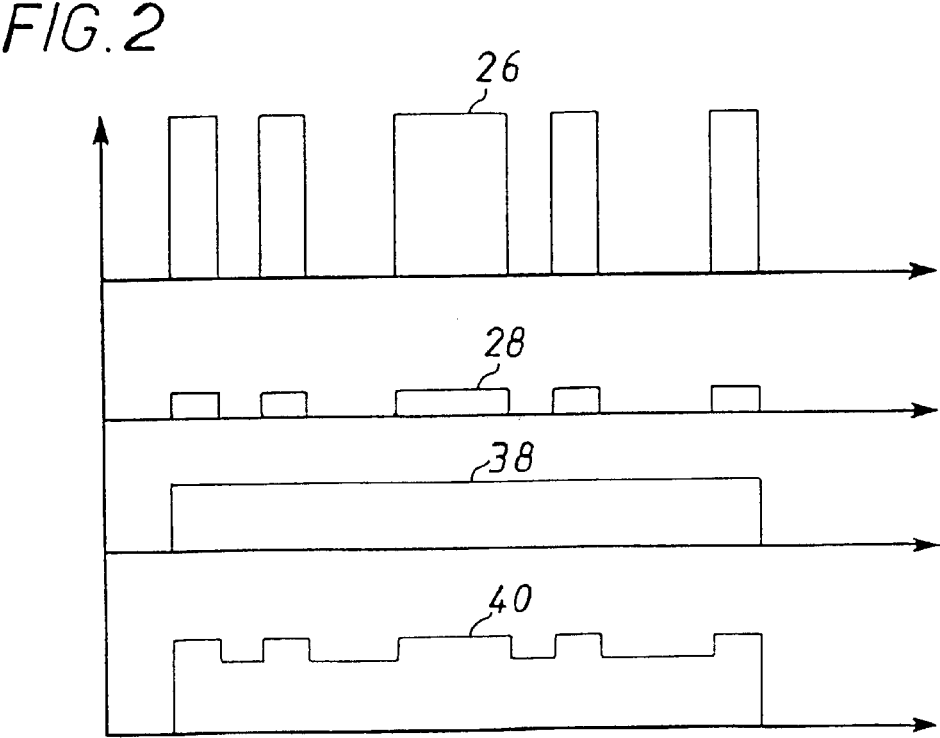
FIGS. 2 and 3 are diagrams each showing a signal emitted by an antenna.

The described device has problems of diaphony set forth in the preamble and a modulated signal which is not zero, shown in the second diagram of FIG. 2 by the curve 28, thus supplies the external antennas 6. The amplitude of this modulated signal, which is a parasitic signal, is of the order of 100 mV.

FIG. 1 shows by a dotted line 30 the field of the antennas 4 supplied by the signal represented by the curve 26. The field of the external antennas 6 each supplied by a parasitic signal (curve 28) is represented by a broken line 32. To indicate an order of magnitude, the field of the antenna 6 is thus of the order of 10 cm.

The present invention proposes superposing on the parasitic signal an unmodulated signal. In the embodiment shown in the drawings, this signal is obtained from the carrier 14 supplying the modulator 8. A branch 34 of the electronic circuit thus connects the supply of the modulator 8 to the amplifier circuit corresponding to the external antennas 6. This branch circuit comprises principally a resistance 36 adapted to the amplitude of the signal which it is desired to superpose. This signal has a large amplitude relative to the amplitude of the parasitic signal, but a small amplitude relative to that of the signal destined for the internal antennas 4.

The signal obtained from the carrier is represented in the third diagram of FIG. 2 by the curve 38. By way purely of illustration and not at all limitation, as for all the other numerical values given in the present description with reference to the drawing, the amplitude of the signal from the carrier is of the order of 500 mV. The signal thus supplying the external antennas is represented by the curve 40 of the fourth diagram of FIG. 2.

When this new signal is emitted by the external antennas 6, it cannot be interpreted by the badge because its rate of modulation is very small. The badge interprets the signal that it receives as a continuous signal and sends no response. The rate of modulation of the signal is defined in the following way:

$$\text{Rate of modulation} = (V_{max} - V_{min})/V_{max}.$$

$V_{max}$ is the maximum voltage of the signal
$V_{min}$ is the minimum voltage of the signal With this definition of rate of modulation, it will be seen that this rate approaches 0% for the signal shown by the curve 40. With the numerical values given above, this rate is about 17%.

Figure 3:
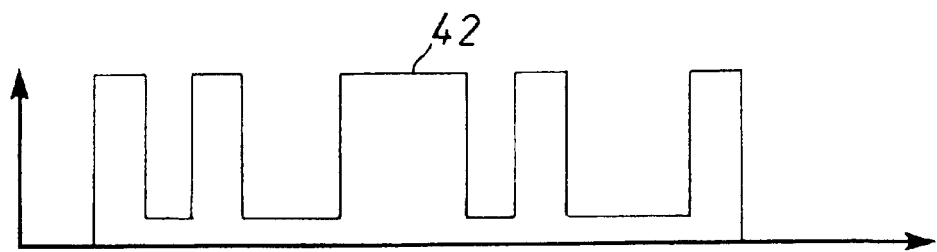

When the external antennas 6 are to be used to locate a badge located outside the vehicle, the signal 20 for selection of the control antennas sends a modulated signal to the external antennas 6. These latter thus receive a signal which is the superposition of a modulated signal and of the unmodulated signal shown at 38. A curve representative of the modulated signal emitted by the external antennas would have the appearance of curve 26 but with a greater amplitude. A curve 42 shown in FIG. 3 schematically shows this new signal corresponding to the superposition of the modulated and unmodulated signals. The presence in this signal of an unmodulated signal is not troublesome. With the numerical values given above by way of non-limiting example, the rate of modulation of this new signal is nearly 100%. Such a signal could thus be normally interpreted by a badge receiving it.

The solution proposed by the invention to solve the problems of diaphony encountered, thus does not consist in improving the performances of the electronics to attenuate the parasitic signal on the antennas which it is desired to render inactive, but consists in emitting an unmodulated signal to these antennas. This solution can be carried out substantially without increase of cost of the electronics with excellent results, because the signal emitted by the antennas cannot be interpreted by the corresponding badges. Relative to these badges, the antennas are thus as though perfectly inactive. Moreover, the signal that is injected does not disturb a normal emission of the antennas because the rate of modulation remains nearly 100%.

In the case in which the driver of the vehicle 2 has placed his badge in a rear pocket of his trousers and leans against the door handle that includes an external antenna 6, the badge will not be located by the free hand system of the vehicle as being in the vehicle because the signal received by the badge cannot be interpreted by this latter. Any attempt to start the motor will thus be without result.

The present invention is not limited to the embodiment described above by way of non-limiting example. It also relates to all modifications within the scope of those skilled in the art within the scope of the following claims.

Thus, the invention is not limited to the control of antennas divided into two separate groups. It can also apply to three (or more) groups of antennas when it is desired that one or several of these groups of antennas, under predetermined conditions, will remain inactive.

In the embodiment described, the carrier is injected, via a resistance, into the amplifier circuit of a single group of antennas. Of course, the carrier can be injected into all the groups of antennas.

What is claimed is:

1. Process for controlling at least two groups of antennas according to which a modulated signal is emitted by a first group of antennas while the antennas of a second group emit a modulated parasitic signal having a lower amplitude, which comprises superposing an unmodulated signal of an amplitude comprised between the amplitude of the parasitic signal and the amplitude of the signal emitted by the first group of antennas on the parasitic signal emitted by the antennas of the second group.

2. The process according to claim 1, wherein the signal emitted by each antenna is the superposition of a modulated signal, parasitic or not, and an unmodulated carrier.

3. Device for controlling antennas distributed in at least two groups of antennas, comprising a modulator, a multiplexer disposed downstream of the modulator and an amplifier circuit disposed between each group of antennas and the multiplexer;

wherein a branch circuit comprising a resistance connects a point upstream of the modulator to a point downstream of the multiplexer, upstream of an amplifier circuit corresponding to a group of antennas.

4. The device for controlling antennas according to claim 3, wherein to each group of antennas there corresponds a branch circuit comprising a resistance.

5. System for free hand access to a vehicle comprising external antennas and internal antennas, an electric identification card, and control electronics; wherein the system further comprises a device for controlling antennas according to claim 3.

* * * * *